Jan. 18, 1966   J. T. JOHNSON   3,229,527
LIQUID SAMPLING APPARATUS
Filed March 28, 1963
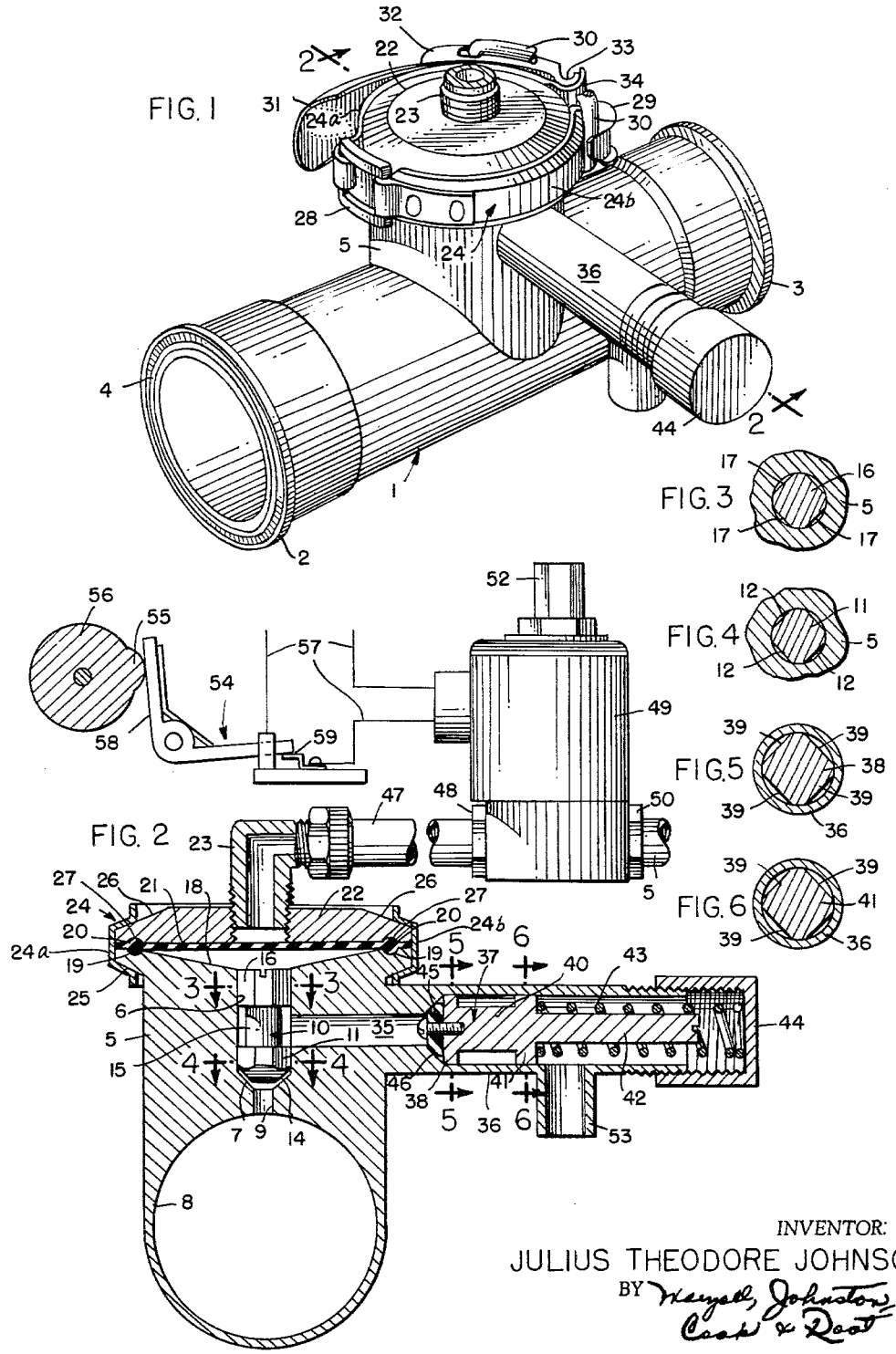
INVENTOR:
JULIUS THEODORE JOHNSON
BY Merrell, Johnston, Cook & Root
ATT'YS

United States Patent Office 3,229,527
Patented Jan. 18, 1966

3,229,527
LIQUID SAMPLING APPARATUS
Julius Theodore Johnson, 348 20th St.,
Cedar Rapids, Iowa
Filed Mar. 28, 1963, Ser. No. 268,762
4 Claims. (Cl. 73—422)

This invention, in general, relates to apparatus and processes for sampling liquids and, more particularly, pertains to apparatus for sampling liquids as they flow through pipes or conduits.

Liquids which stratify into layers of different composition, e.g., milk, present problems in accurate sampling inasmuch as samples must be taken from various portions of the liquid in representative amounts in order that the total sample is representative of the non-uniform liquid body. Taking raw milk as an example, the cream portion stratifies at the top of the liquid body, and milk low in butter fat content is at the bottom of the tank or other vessel. When milk is pumped from a tank truck into a dairy plant, the quality of the milk, i.e., its average butter fat content, must be ascertained as well as its volume or weight in order to determine the value of the milk trucked to the dairy plant. This may be done by sampling in tanks, either the tank truck or in tanks in the dairy into which the milk is pumped, but a much more convenient technique is that provided by this invention.

In accordance with this invention, as the milk is pumped through a conduit or pipe, a small portion is withdrawn from the pipe at predetermined, equally spaced increments of milk flowing through the pipe or conduit, e.g., equally spaced increments by weight or increments by volume. When the milk is drawn out of a tank truck with the outlet near the bottom of the tank, the first portions of the milk will be considerably lower in butter fat content than the last portion of the milk pumped into the dairy plant.

By withdrawing small samples of equal volume at equally spaced increments by volume or weight of the milk during its flow through a conduit or pipe and collecting the withdrawn samples, the total sample is collected which is closely representative of the average composition of the entire body of milk pumped through the pipe or conduit, e.g., from a tank truck through a pipe or hose into a dairy plant.

In accordance with the invention, there is provided, in communication with a conduit, a small orifice into which milk can flow as it is pumped through the conduit. This small orifice communicates with a sampling chamber which can fill with a constant volume of milk. Periodically, preferably in response to a measurement by weight or by volume of milk flowing through the conduit, the sampling chamber is emptied, and the milk sample emptied from the sampling chamber is collected. The sampling chamber is then allowed to fill again with milk whereby another representative sample is obtained. By repeating this cycle over a regular sequence, preferably in a sequence corresponding to equal increments by weight or volume of the milk flowing through the conduit, an aggregate representative sample is obtained over the entire flow cycle.

The sampling apparatus for achieving these objectives of the invention comprises a conduit section adapted to be coupled into a milk pumping line. This conduit section may be one having a body portion in which a sampling chamber is located, or the sampling chamber may be a separate body connected by a short conduit tapped into the milk flow line. The sampling chamber and the conduit section are communicated by a small orifice, and the communication may be blocked by a check valve when the sampling chamber is emptied. The sampling chamber has at one end thereof a pop valve which normally blocks communication between the sampling chamber and a discharge chamber. The body portion has a diaphragm, the outer side of which communicates with a coupling for an air pressure line. The inner side of the diaphragm forms a movable wall of the sampling chamber. When the diaphragm is moved inwardly into the sampling chamber by air pressure against its outer surface, the pressure created by the movement of the diaphragm forces the check valve to shift to a position to block communication through the small orifice between the sampling chamber and the milk conduit or line. The pressure also activates the pop valve to move it to non-blocking relationship between the sampling chamber and the discharge chamber. This, in turn, allows a given volume of liquid to flow out of the sampling chamber into the discharge chamber, from which it is collected.

When the air pressure on the outer side of the diaphragm is released, it returns to normal position. When the pressure in the sampling chamber drops to a value at which the liquid pressure force drops below the bias force of the spring of the pop valve, the pop valve moves back to blocking relationship between the sampling chamber and the discharge chamber. The pressure in the main milk line moves the check valve into non-blocking position between the small orifice and the sampling chamber, and the sampling chamber again fills with milk entering it through the small orifice.

The filling and dumping of the sampling chamber is done in a short time interval and the sampling apparatus stays dormant over a period of time. After a given interval, the diaphragm is again moved by air pressure and the aforedescribed sampling cycle is repeated.

In order to control the sequence of the sampling cycles in response to predetermined volume or weight increments of milk flowing through the conduit, the air pressure line may have a three-way solenoid valve which either isolates the air pressure source from the diaphragm, e.g., by venting the pressure line connected to the air source out a passage in the valve or communicates the air pressure line with the line connecting the valve and a coupling on the body portion of the sampling apparatus, e.g., by closing off the vent passage in the valve.

The solenoid valve, in turn, may be energized or de-energized by a counter mechanism or similar mechanism driven by apparatus which measures the weight or volume of liquid flowing through the conduit. As an example, the counter mechanism may be one having the counting wheels rotated by a volume measurement meter, a scale or a load cell scale. One of the counter wheels, i.e., the ten unit indicator counter wheel, may have a small protrusion which moves a movable member of a microswitch provided in the circuit for the solenoid valve. Depending upon the structure of the valve, and/or its circuitry, the opening or closing of the microswitch and the energizing of the solenoid valve circuit or the de-energizing thereof will vent the air pressure at the inlet side of the solenoid valve out of the valve or direct it through the connecting line against the outer side of the diaphragm.

The foregoing concepts and other important objects, features, and inherent functions of the invention will be more fully appreciated as the invention is more further described in the following description, which, taken in connection with the accompanying drawings, discloses a preferred embodiment of the invention.

FIG. 1 is a perspective view of a pipe or conduit piece adapted to be coupled in a pipe line or conduit with a sampling chamber body portion thereon;

FIG. 2 is a cross-sectional view taken on section 2—2 of FIG. 1, in which view is also shown the solenoid valve, the electrical circuit therefor, including the microswitch, and the counter wheel which activates the microswitch;

FIGS. 3, 4, 5 and 6 are cross-sectional views taken, respectively, on sections 3—3, 4—4, 5—5 and 6—6 of FIG. 2;

Referring to the drawings, there is shown a conduit section 1 having end flanges 2, 3 with a seal ring groove 4 in each flange. The conduit section has a cylindrical body portion 5 extending radially outwardly therefrom. The body portion 5 has an axial, cylindrical passage 6 with a frusto-conical valve seat 7 at one end thereof. The tubular passage 8 in the conduit section 1 is in communication with the axial passage 6 via a small orifice 9.

A check valve 10 is slidably mounted in the axial passage 6. The head 11 of the check valve has flattened sides 12 which permit fluid to flow past the head 11. The head 11 also has a frusto-conical surface 14 adapted to seat against the frusto-conical valve seat 7.

The head portion 11 of the check valve is connected by shank 15 to a guide or tail portion 16 having flattened sides 17 allowing for liquid flow past the tail portion.

The axial passage 6 intercepts a dish-shaped recess 18 in the radially outer end of the body portion 5. The outer surface of the body portion 5 has a circular groove 19 around the dish-shaped recess 18. This groove accommodates a seal ring 20 formed integrally with a disc-shaped elastomer diaphragm 21.

The elastomer diaphragm 21 is tightly held on the body portion by means of a cap disc 22 having radially central passage in which is mounted an elbow nipple 23. The cap disc 22 is locked on the body portion by a clamp ring 24 of arcuate cross-section. When the clamp ring 24 is clamped around the tapered edges 25, 26 of the body portion and the cap disc, the cap disc and the body portion are drawn tightly together with the seal ring seated tightly in the groove 27 in the undersurface of the cap ring and the groove 19 and the upper surface of the body portion. Briefly, the clamp ring comprises a pair of ring sections 24a, 24b, each hingedly connected to a link 28. The section 24b has a hook 29 in which a link 30 is pivotally seated. The other end of link 30 is pivotally connected to lever arm 31 through head portion 32 located near one end of lever arm 31. Upon pivoting of arm 31, its end 33 pushes against the hooked end 34 of ring section 24a and thus draws through link 30 sections 24a, 24b tightly around the cap 22 and flange of body portion 5 to clamp them together.

The body portion 5 has a radial passage 35 intercepting the axial passage 6. This transverse passage communicates with a radially outwardly extending tube 36 mounted on the body portion 5. The tube 36 has a pop valve 37 slidably mounted therein. The pop valve 37 comprises a head portion 38 having flattened sides 39 permitting passage of fluid past the head 38. The shank portion 40 connects the head portion 38 with a tail portion 41 also having flattened sides 39.

The pop valve has an axial shank 42 around which is positioned a coil spring 43, one end of which bears against the inner side of a cap 44 threaded on the threaded outer end of the tube 36 and the outer end of which bears against pop valve tail portion 41. The pressure of the spring against the pop valve 37 can be adjusted by threading the cap 44 onto the tube 36 to increase the spring pressure or threading the cap 44 off the tube 36 to decrease spring pressure. The head portion 38 has an elastomer, e.g., rubber, frusto-conical seal ring or washer 45, mounted on the end thereof, the frusto-conical portion of which seats in sealing engagement against the frusto-conical wall 46 between passage 35 and tube 36. The diameter of the base of the seal ring or washer 45 is less than the inner diameter of tube 36.

The diaphragm 21 is driven into the dish-shaped portion 18 by applying fluid pressure, e.g., hydraulic or air pressure against the outer surface of the diaphragm. This may be accomplished conveniently by connecting an air pressure line 47 to the nipple 23 and to the outlet coupling 48 of a three-way solenoid valve 49. The inlet coupling 50 of the solenoid valve is connected to an air pressure line 51 connected, in turn, to an air pressure source. The solenoid valve has a vent outlet 52 through which air from the line 51 is normally vented. When the solenoid valve is energized, the communication through the valve between the line 51 and the vent 52 is blocked, and the pressurized air in the line 47 moves the diaphragm 18 into dish-shaped portion 18. When this occurs, the check valve 10 is forced into seating engagement with the valve seat 7, blocking off the orifice 9. The fluid pressure created in the sampling chamber, i.e., in the dish-shaped portion 18, the axial passage 6, and the radial passage 35, causes the valve 37 to pop. The valve 37 moves toward the cap 44, and washer 45 is unseated. Liquid in the sampling chamber is thus discharged from the sampling chamber into the discharge chamber formed by tube 36, from which it flows out of the dump tube 53 and is collected.

When the solenoid is deenergized, the pressure in line 47 returns to normal by virtue of the venting of the air from line 51 through the vent passage 52. The diaphragm 18 springs back to home position, i.e., the position shown in FIG. 2, creating a vacuum in the sampling chamber. The check valve 10 slides axially in the passage 6 into non-blocking relationship so that fluid flowing through the tubular conduit can flow through the orifice 9 into the sampling chamber to replenish or replace the amount of sample discharged out of the dump tube 53.

The weight or volume responsive mechanism for energizing and deenergizing the solenoid valve 49 comprises a microswitch 54 activated by a knob or protrusion 55 on a counter wheel of a counter mechanism driven by a weight or volume measurement instrument measuring the weight or volume of milk flowing through the line in which conduit section 1 is coupled. If the knob 55 is on the ten unit counter wheel, for example, it will activate, e.g., close, microswitch 54 at each hundred weight or volume interval. The ten unit wheel makes one complete revolution each hundred weight or volume. The switch is activated over a ten-weight or volume interval, after which the knob 55 orbits to a non-activating position for a ninety-weight or volume interval.

In the illustrated situation, the activation of microswitch 54 by knob 55 closes the switch and completes the electrical circuit of the solenoid valve 49. When valve 49 is energized, the air pressure line 51 is in communication with line 47, and the sample chamber is emptied as aforedescribed by the movement of diaphragm 21. When counter wheel knob 55 orbits out of range of the arm 58 of the switch, the switch contact 59 opens, and the valve is deenergized. In this state, the air from line 51 is vented out of the valve through vent line 52. The air pressure on diaphragm 21 is released, and it springs back to normal or rest position (FIG. 2). The sample chamber is refilled with a new sample. The volume of sample discharged and refilled in each cycle is equal to the volume defined by dish-shaped recess 18 and the overlying diaphragm 21.

The volume or intervals at which samples are taken in order to give a good, representative total sample will vary with the type of pumping, the tank structure and location of its outlet, the degree of variation in composition between upper and lower layers of the body of milk, etc. Accordingly, the sampling at hundred intervals is intended as being only illustrative and may be varied if another unit interval gives a better sampling. Also, the invention may be used in applications other than sampling of milk, e.g., in sampling non-uniform chemical solutions, suspensions, etc., for quality control operations or other purposes in chemical plants, etc.

The invention is hereby claimed as follows:

1. A liquid sampling device comprising a conduit, a body portion on one side of said conduit and extending outwardly therefrom, said body portion having an axial passage extending radially with reference to said conduit, one end of said axial passage and said conduit being connected by a small passage therebetween, a check valve axially slidable in said passage, a valve seat in said axial passage contiguous to said small passage, a head on said check valve with a surface mated with and adapted to seat against said valve seat, means in said body portion at the other end of said axial passage forming a diaphragm chamber communicating with said other end, a flexible diaphragm extending across said chamber with the inner side of said diaphragm forming a movable wall of said chamber, said body portion having a liquid discharge passage extending laterally from said axial passage at a point in the latter between said head and said diaphragm chamber, means associated with the outer side of said diaphragm for exerting fluid pressure thereagainst at spaced intervals to push periodically said diaphragm into said diaphragm chamber, thereby causing said surface of said check valve to seat against said valve seat and resulting in a build-up of fluid pressure in said chamber and passage, and valve means associated with said discharge passage and adapted to open to allow fluid flow from said axial passage through said passage when said build-up of fluid pressure occurs in said chamber and axial passage.

2. A liquid sampling device comprising a conduit, a body portion on one side of said conduit and extending outwardly therefrom, said body portion having an axial passage extending radially with reference to said conduit, one end of said axial passage and said conduit being connected by a small passage therebetween, a check valve axially slidable in said passage, a valve seat in said axial passage contiguous to said small passage, a head on said check valve with a surface mated with and adapted to seat against said valve seat, means in said body portion at the other end of said axial passage forming a diaphragm chamber communicating with said other end, a flexible diaphragm extending across said chamber with the inner side of said diaphragm forming a movable wall of said chamber, said body portion having a liquid discharge passage extending laterally from said axial passage at a point in the latter between said head and said diaphragm chamber, means associated with the outer side of said diaphragm for exerting fluid pressure thereagainst at spaced intervals to push periodically said diaphragm into said diaphragm chamber, thereby causing said surface of said check valve to seat against said valve seat and resulting in a build-up of fluid pressure in said chamber and passage, a tube extending laterally from said body portion with its inner end communicating with said discharge passage, threads on the opposite end of said tube, a cap threaded on said threads, a pop valve slidable in said tube, a valve seat in said inner end of said tube, and a coil spring having one end bearing against said cap and the other end bearing against said pop valve and urging said pop valve against said last-mentioned seat, whereby the pressure exerted against said pop valve by said spring may be adjusted by threading said cap on said threads to elongate or compress said spring.

3. A sampling device as claimed in claim 1, said head having portions in slidable contact with the wall of said axial passage alternating with small clearances between said wall and said head, said clearances defining passages allowing liquid flow therethrough, a tail portion of said check valve in slidable contact with said wall, a shank rigidly connecting said head to said tail portion, and means on said tail portion providing small clearances between said tail portion and said wall and defining passages allowing liquid flow therethrough.

4. A sampling device as claimed in claim 3 wherein said liquid discharge passage communicates with said axial passage at a point opposite said shank.

References Cited by the Examiner

UNITED STATES PATENTS

| 662,154 | 11/1900 | Schmick | 137—542 |
|---|---|---|---|
| 2,394,272 | 2/1946 | Thiel | 137—533.17 |
| 2,548,193 | 4/1951 | Blum | 73—422 |
| 2,598,535 | 5/1952 | Green | 73—422 |
| 2,995,931 | 8/1961 | Perry et al. | 73—422 X |
| 3,067,764 | 12/1962 | Geary | 92—99 X |
| 3,106,844 | 10/1963 | Sonnberg | 73—422 |

OTHER REFERENCES

Gibson Oil and Gas Journal, Feb. 1, 1954, vol. 52, No. 39, pp. 68, 69, TN 860.039.

LOUIS R. PRINCE, *Primary Examiner.*

ROBERT L. EVANS, RICHARD C. QUEISSER,
*Examiners.*